(12) United States Patent
Samudrala et al.

(10) Patent No.: US 7,675,935 B2
(45) Date of Patent: Mar. 9, 2010

(54) APPARATUS AND METHOD FOR INTEGRATING WIRELESS OR OTHER FIELD DEVICES IN A PROCESS CONTROL SYSTEM

(75) Inventors: Prasad Samudrala, Bangalore (IN); Alexander Chernoguzov, Warrington, PA (US); Vanathi Ravindran, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 756 days.

(21) Appl. No.: 11/444,043

(22) Filed: May 31, 2006

(65) Prior Publication Data

US 2007/0280287 A1    Dec. 6, 2007

(51) Int. Cl.
*H04J 3/22* (2006.01)
(52) U.S. Cl. .................................. 370/466; 370/401
(58) Field of Classification Search .................. 370/401, 370/402, 465, 466, 467, 400
See application file for complete search history.

(56) References Cited

U.S. PATENT DOCUMENTS

| | | | |
|---|---|---|---|
| 6,424,872 B1* | 7/2002 | Glanzer et al. ................. 700/18 |
| 6,847,316 B1 | 1/2005 | Keller | |
| 7,088,735 B1* | 8/2006 | Reohr et al. ................. 370/466 |
| 2002/0120671 A1 | 8/2002 | Daffner et al. | |
| 2002/0122230 A1 | 9/2002 | Izadpanah et al. | |
| 2003/0023795 A1* | 1/2003 | Packwood et al. .......... 710/105 |
| 2004/0196844 A1* | 10/2004 | Hagino ........................ 370/389 |
| 2004/0230899 A1 | 11/2004 | Pagnano et al. | |
| 2004/0259533 A1* | 12/2004 | Nixon et al. ............. 455/414.1 |
| 2005/0141553 A1 | 6/2005 | Kim et al. | |
| 2005/0228509 A1 | 10/2005 | James | |
| 2007/0067458 A1* | 3/2007 | Chand ........................ 709/226 |
| 2007/0153677 A1 | 7/2007 | McLaughlin et al. | |
| 2007/0237137 A1 | 10/2007 | McLaughlin | |

FOREIGN PATENT DOCUMENTS

DE       103 14 721 A1    11/2004

(Continued)

OTHER PUBLICATIONS

International Search Report and Written Opinion of the International Searching Authority in PCT Application No. PCT/US2007/069717 dated Dec. 10, 2007.

(Continued)

*Primary Examiner*—Ricky Ngo
*Assistant Examiner*—Wei-Po Kao
(74) *Attorney, Agent, or Firm*—Munck Carter LLP

(57) ABSTRACT

An apparatus is provided for facilitating communication between, for example, a configuration tool in a process control system and a wireless field device (such as a wireless sensor or actuator). The configuration tool and the wireless field device use different protocols, and the apparatus converts between the different protocols. The protocol used by the configuration tool could include HART. From the perspective of the wireless field device, the apparatus could appear to support the application protocol of the wireless field device. From the perspective of the configuration tool, the apparatus could simulate a HART multiplexer. This may allow a user to use the configuration tool to configure, commission, and monitor the wireless field device, even when the user does not know or understand the protocol used by the wireless field device.

21 Claims, 4 Drawing Sheets

FOREIGN PATENT DOCUMENTS

| | | |
|---|---|---|
| EP | 1 401 171 A2 | 3/2004 |
| GB | 2 427 329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069614 dated Nov. 22, 2007.

Pereira J. M. D., "A fieldbus prototype for educational purposes", IEEE Instrumentation and Measurement Magazine, vol. 7, No. 1, Mar. 2004, pp. 24-31.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

* cited by examiner

APPARATUS AND METHOD FOR INTEGRATING WIRELESS OR OTHER FIELD DEVICES IN A PROCESS CONTROL SYSTEM

CROSS-REFERENCE TO RELATED APPLICATIONS

This application is related to the following concurrently filed U.S. patent applications:

Ser. No. 11/444,044 entitled "APPARATUS AND METHOD FOR CONVERTING BETWEEN DEVICE DESCRIPTION LANGUAGES IN A PROCESS CONTROL SYSTEM";

Ser. No. 11/444,200 entitled "APPARATUS AND METHOD FOR INTEGRATING WIRELESS FIELD DEVICES WITH A WIRED PROTOCOL IN A PROCESS CONTROL SYSTEM"; and Ser. No. 11/443,773 entitled "APPARATUS, SYSTEM, AND METHOD FOR INTEGRATING A WIRELESS NETWORK WITH WIRED FIELD DEVICES IN A PROCESS CONTROL SYSTEM";

all of which are hereby incorporated by reference.

TECHNICAL FIELD

This disclosure relates generally to control systems and more specifically to an apparatus and method for integrating wireless or other field devices in a process control system.

BACKGROUND

Processing facilities are often managed using process control systems. Example processing facilities include manufacturing plants, chemical plants, crude oil refineries, and ore processing plants. Among other operations, process control systems typically interact with and control various field devices, such as sensors and actuators, in the processing facilities.

Field devices are typically configured and commissioned to operate in a specific process control system and are monitored during operation in that process control system. Engineers, operators, or other personnel routinely use configuration tools to configure, commission, and monitor the field devices. Different configuration tools are often used in different process control systems or even within the same process control system, often depending on the type(s) of communication protocol(s) used in the process control system(s). Quite a few of the communication protocols are standard, and a configuration tool associated with a standard communication protocol can often be used in any process control system supporting that communication protocol.

SUMMARY

This disclosure provides an apparatus and method for integrating wireless or other field devices in a process control system.

In a first embodiment, a method includes receiving first information from a configuration tool in a process control system. The configuration tool is associated with a first field device protocol. The method also includes converting the first information associated with the first field device protocol into second information associated with a second field device protocol. In addition, the method includes communicating the second information to a field device in the process control system.

In particular embodiments, the method also includes receiving third information associated with the second field device protocol, converting the third information into fourth information associated with the first field device protocol, and communicating the fourth information to the configuration tool. The third information originates at the field device.

In other particular embodiments, the first field device protocol includes a Highway Addressable Remote Transducer (HART) protocol, and the second field device protocol includes a wireless protocol. Also, converting the first information into the second information includes using (i) a first list associating HART manufacturer identifiers and vendor names and/or (ii) a second list associating HART device types and vendor model names.

In yet other particular embodiments, converting the first information into the second information includes using (i) a generic device descriptor associated with multiple types of field devices, (ii) a generic device descriptor having one or more device-specific commands associated with multiple types of field devices, and/or (iii) a device descriptor having one or more device-specific commands associated with a particular type of field device or with a particular field device.

In a second embodiment, an apparatus includes at least one memory operable to store mapping information defining mappings between a first field device protocol and a second field device protocol. The apparatus also includes at least one processor operable to receive a first command associated with the first field device protocol. The at least one processor is also operable to convert the first command into a second command associated with the second field device protocol using at least some of the mapping information. In addition, the at least one processor is operable to communicate the second command over a network to a field device in a process control system.

In a third embodiment, a computer program is embodied on a computer readable medium and is operable to be executed by a processor. The computer program includes computer readable program code for receiving first information from a source in a process control system. The first information is associated with a first field device protocol. The computer program also includes computer readable program code for converting the first information associated with the first field device protocol into second information associated with a second field device protocol. In addition, the computer program includes computer readable program code for communicating the second information to a target in the process control system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
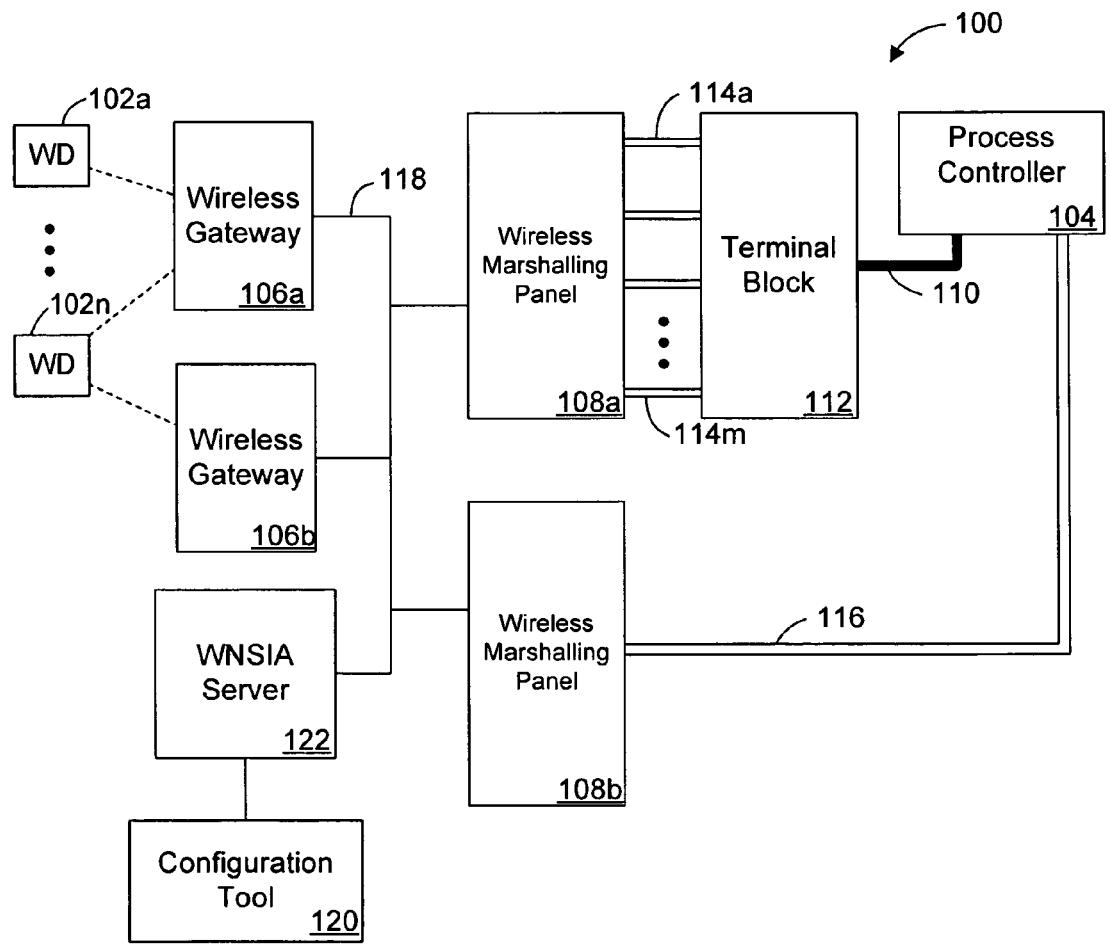
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example, the process control system 100 includes multiple wireless field devices 102a-102n. The wireless field devices 102a-102n represent components in a process or production system that may perform any of a wide variety of functions. For example, the wireless field devices 102a-102n could represent sensors capable of measuring one or more characteristics of a process or production system. The wireless field devices 102a-102n could also represent valves or other actuators capable of performing one or more actions that alter the process or production system. Each of the wireless field devices 102a-102n includes any suitable device or structure for performing one or more functions in a process or production system.

A process controller 104 controls the operation of the wireless field devices 102a-102n. For example, the process controller 104 may be capable of receiving data from one or more of the wireless field devices 102a-102n (such as sensors) and providing control signals to one or more of the wireless field devices 102a-102n (such as actuators). The process controller 104 includes any hardware, software, firmware, or combination thereof for controlling one or more of the wireless field devices 102a-102n.

In this example, the wireless field devices 102a-102n communicate with the process controller 104 through one or more wireless gateways 106a-106b and one or more wireless marshalling panels 108a-108b. Each of the wireless gateways 106a-106b is capable of transmitting information wirelessly to and receiving information wirelessly from the wireless field devices 102a-102n. Each of the wireless gateways 106a-106b includes any device or structure for wirelessly communicating with one or more of the wireless field devices 102a-102n. Each of the wireless gateways 106a-106b could, for example, include one or more radio frequency (RF) transmitters, receivers, or transceivers.

The wireless marshalling panels 108a-108b facilitate communication between the wireless field devices 102a-102n and the process controller 104. For example, the wireless marshalling panels 108a-108b may enable the process controller 104 to communicate with the wireless field devices 102a-102n without requiring the process controller 104 to understand the communication protocol(s) used by the wireless field devices 102a-102n.

As a particular example, the process controller 104 could support the Highway Addressable Remote Transducer (HART) protocol, where signals for field devices are transmitted by the process controller 104 over a multi-conductor cable 110 to a terminal block 112. The terminal block 112 separates the signals for the field devices into wire pairs 114a-114m, where each wire pair is associated with a different field device. In these embodiments, the wireless marshalling panel 108a could convert HART-compliant signals received from the process controller 104 into messages sent to the wireless gateways 106a-106b. The wireless marshalling panel 108a could also convert messages from the wireless gateways 106a-106b into HART-compliant signals sent to the process controller 104. The use of the multi-conductor cable 110 and terminal block 112 with the HART protocol is for illustration only. Any other input/output technique and/or communication network could be used with the HART protocol.

As another particular example, the process controller 104 could support the Foundation Fieldbus (FF) High Speed Ethernet (HSE) protocol, where signals for field devices are transmitted from the process controller 104 over a single wire pair 116. In these embodiments, the wireless marshalling panel 108b may transmit FF HSE-compliant signals to and receive FF HSE-complaint signals from the process controller 104, while at the same time providing data to and receiving data from the wireless gateways 106a-106b using a different protocol.

Each of the wireless marshalling panels 108a-108b could include any device or structure facilitating communication between the wireless field devices 102a-102n (via the gateways 106a-106b) and the process controller 104. Additional details regarding the wireless marshalling panels 108a-108b can be found in U.S. patent application Ser. No. 11/394,947 entitled "APPARATUS, SYSTEM, AND METHOD FOR INTEGRATION OF WIRELESS DEVICES WITH A DISTRIBUTED CONTROL SYSTEM," which is hereby incorporated by reference. The wireless marshalling panels 108a-108b could support the use of any suitable field device protocol(s), such as HART, FF HSE, FF H1, Modbus, Profibus, and WorldFIP. In this document, the phrase "field device protocol" refers to any protocol(s) for communicating with one or more field devices in a control system (whether or not the field devices of the control system actually use that protocol).

A network 118 couples the wireless gateways 106a-106b and the wireless marshalling panels 108a-108b. The network 118 represents any suitable computing or communication network capable of transporting data, such as one or more local area networks (LANs), metropolitan area networks (MANs), wide area networks (WANs), all or a portion of a global network such as the Internet, or any other communication system or systems at one or more locations. As particular examples, the network 118 could represent an RS-485 network or an Ethernet network. The network 118 could also represent a redundant set of networks, such as a pair of Ethernet networks forming a Fault Tolerant Ethernet (FTE) network.

In this example embodiment, the process control system 100 includes one or more configuration tools 120. A configuration tool 120 may represent a tool (such as a software program) used to configure, commission, and monitor field devices 102a-102n. The configuration tool 120 could be associated with a particular field device protocol, such as when the tool 120 is a HART configuration tool. As particular examples, the configuration tool 120 could represent a HART Field Device Manager (FDM) or a HART Asset Management System (AMS).

Figure 4:
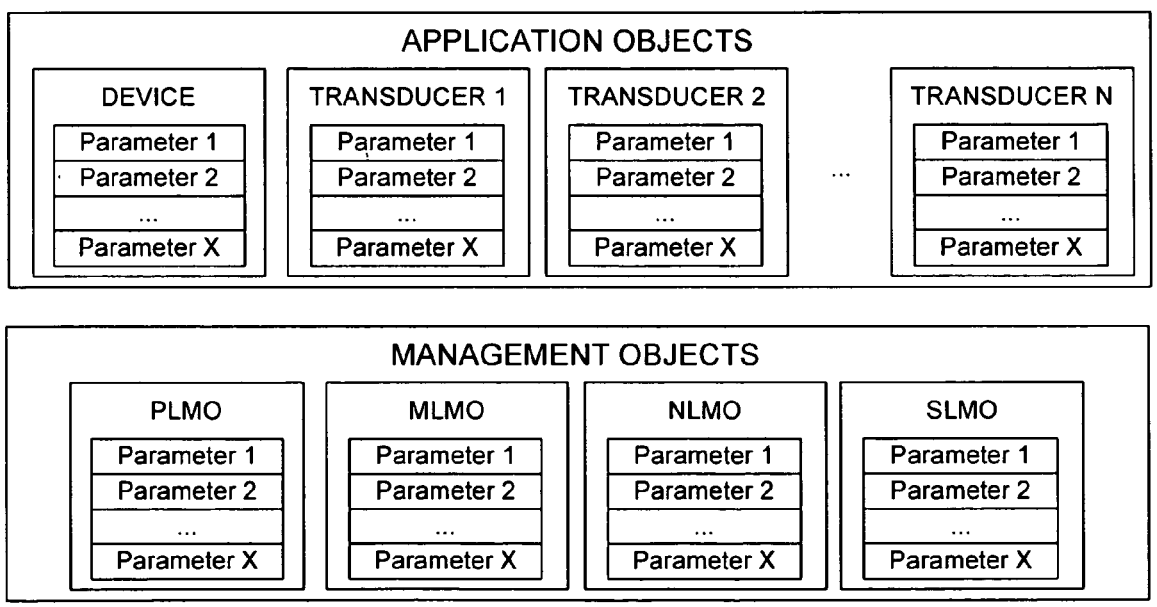
FIGS. 4 through 6 illustrate example details of a wireless protocol used in a process control system according to one embodiment of this disclosure.
Figure 5:
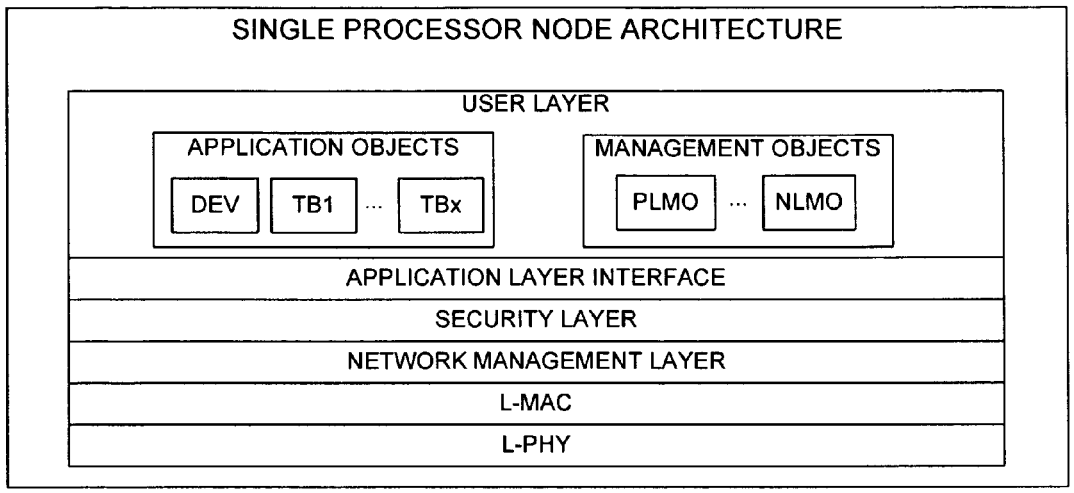
Figure 6:
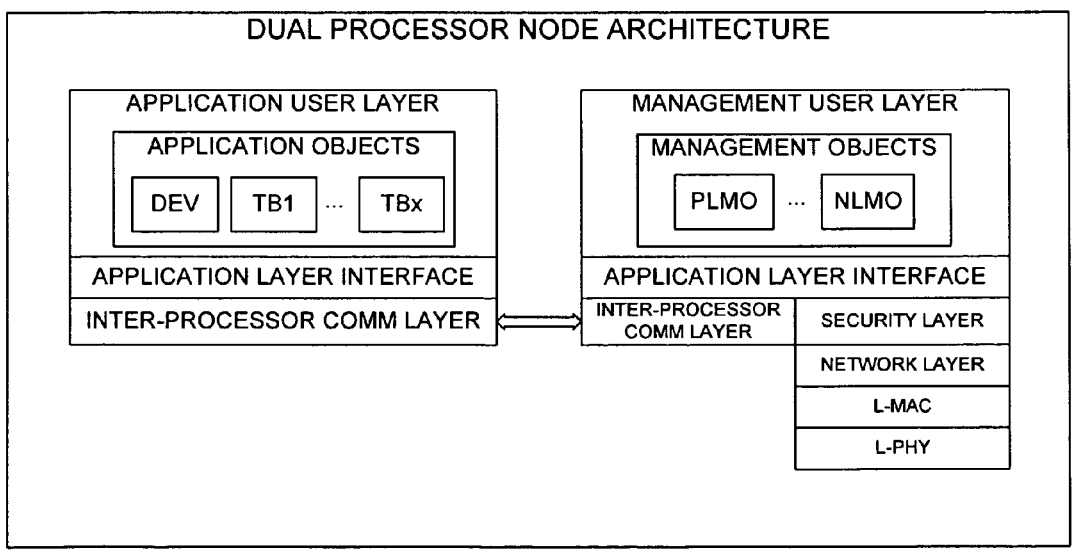

At least one of the wireless field devices 102a-102n in FIG. 1 may represent a field device that uses a protocol differing from the protocol used by the configuration tool 120. For example, a wireless field device could use a non-standard protocol, a protocol that is new in the process control industry, or a protocol that is unfamiliar to a user of the configuration tool 120. As a particular example, one or more of the wireless field devices 102a-102n could represent devices that use the WIRELESS NETWORK FOR SECURE INDUSTRIAL APPLICATION (WNSIA) protocol from HONEYWELL INTERNATIONAL INC. Details regarding the WNSIA protocol are shown in FIGS. 4 through 6, which are described below. In order to configure these types of field devices, a user would typically need to use a new configuration tool (such as a WNSIA configuration tool). This would often force the user to learn how to use a new protocol and a new configuration tool.

According to this disclosure, a configuration tool 120 associated with one field device protocol may be used to configure, commission, and monitor field devices that use a different field device protocol. For example, a HART configuration tool 120 could be used to configure, commission, and monitor WNSIA field devices. In this way, a user familiar with the HART configuration tool 120 is not required to learn how to use a WNSIA configuration tool. Also, the user may not be required to learn all of the details of the WNSIA protocol in order to use the WNSIA field devices. In addition, an organization may not be required to purchase a WNSIA configuration tool to use the WNSIA field devices, resulting in a reduction in the cost of obtaining and using the WNSIA field devices.

In the example shown in FIG. 1, the configuration tool 120 is coupled to a WNSIA server 122. The WNSIA server 122 supports the use of the WNSIA protocol in the process control system 100. For example, the WNSIA server 122 may receive commands in a particular field device protocol from the configuration tool 120 or other source and convert the commands into WNSIA commands for a WNSIA field device or other target. The WNSIA server 122 may also receive messages from the WNSIA field devices (via the wireless gateways 106a-106b) and convert the messages into messages compliant with the particular field device protocol used by the configuration tool 120. As a specific example, the WNSIA server 122 could convert HART commands into WNSIA commands and WNSIA responses into HART responses. This may allow a HART configuration tool 120 to control and monitor the WNSIA field devices.

The WNSIA server 122 includes any hardware, software, firmware, or combination thereof for supporting the use of WNSIA field devices. Although shown as a server, the functionality of the WNSIA server 122 could be implemented on any other or additional computing device(s), such as a personal computer (like a desktop or laptop computer). In particular embodiments, the WNSIA server 122 is coupled to the configuration tool 120 by a serial link (such as an RS-485 link).

The use of WNSIA field devices with a HART configuration tool 120 is for illustration only. Any configuration tool 120 could be used to configure field devices that use a different field device protocol than the configuration tool 120. For example, a Foundation Fieldbus configuration tool 120 or a Profibus configuration tool 120 could be used to configure WNSIA field devices. As another example, a WNSIA configuration tool 120 could be used to configure field devices that use a different protocol. The field devices being configured by the configuration tool 120 could include wireless and/or wired field devices.

Although FIG. 1 illustrates one example of a process control system 100, various changes may be made to FIG. 1. For example, a control system could include any number of field devices (including wired and/or wireless field devices), controllers, gateways, wireless marshalling panels, terminal blocks, and tools. Also, while FIG. 1 illustrates two types of connections between the wireless marshalling panels 108a-108b and the process controller 104, the system 100 could include any number and type of connections. Further, FIG. 1 illustrates one functional division between components in the system 100. However, various components in FIG. 1 could be combined or further subdivided, such as by combining the configuration tool 120 and the WNSIA server 122 into a single physical unit. Various components could also be omitted from the system 100 if their functionality is not desired or required in a particular implementation. In addition, FIG. 1 illustrates one operational environment in which the conversion of information between field device protocols can occur. This functionality could be used in any other suitable device or system.

Figure 2:
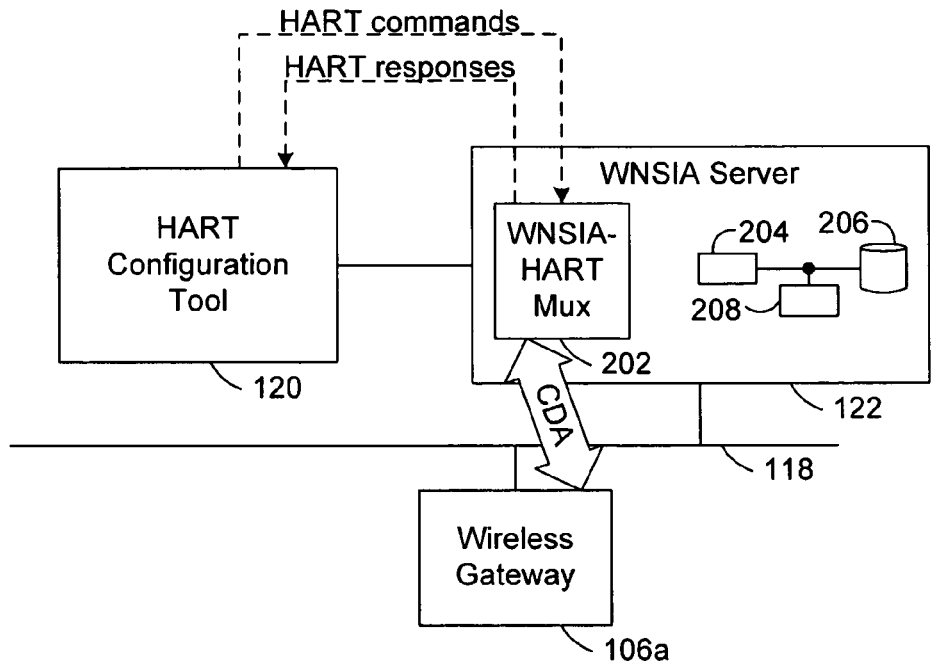
FIG. 2 illustrates additional details of an example process control system according to one embodiment of this disclosure.

FIG. 2 illustrates additional details of an example process control system 100 according to one embodiment of this disclosure. In particular, FIG. 2 illustrates additional details regarding the arrangement and operation of the configuration tool 120 and the WNSIA server 122. The additional details shown in FIG. 2 are for illustration only. The process control system 100 could have other configuration tools or servers without departing from the scope of this disclosure. Also, for ease of explanation, the configuration tool 120 and the WNSIA server 122 are described as operating in the process control system 100 of FIG. 1. The configuration tool 120 and the WNSIA server 122 could be used in any other suitable system.

In this example, the configuration tool 120 represents a HART configuration tool 120, which is typically used to configure HART field devices. Also, in this example, the WNSIA server 122 implements a WNSIA-HART multiplexer 202. The WNSIA-HART multiplexer 202 implements or functions as a protocol converter to convert between the HART and WNSIA protocols. From the perspective of the field devices, the WNSIA-HART multiplexer 202 appears as a device that supports a WNSIA application protocol. From the perspective of the HART configuration tool 120, the WNSIA-HART multiplexer 202 simulates a HART multiplexer connection.

As shown in FIG. 2, the WNSIA-HART multiplexer 202 receives HART commands from the configuration tool 120 and converts them into Control Data Access (CDA) commands. A wireless gateway (such as gateway 106a) in turn receives the CDA commands from the WNSIA-HART multiplexer 202 and communicates them to the WNSIA field devices using the WNSIA protocol. The WNSIA-HART multiplexer 202 also receives CDA responses from the wireless gateway and converts them into HART responses for the configuration tool 120. This allows the HART configuration tool 120 to configure and access the WNSIA field devices. For example, the HART configuration tool 120 could access the WNSIA field devices as if they were HART devices coupled to a HART multiplexer. As particular examples, the HART configuration tool 120 could access and control the WNSIA field devices as if they were connected to a HART MTL, Stahl, or Pepperl+Fuchs multiplexer. In this example, the wireless gateway 106a may contain or have access to the WNSIA field device details, allowing the wireless gateway 106a to respond to CDA commands with the appropriate CDA responses (which are then converted into HART responses).

The WNSIA-HART multiplexer 202 includes any hardware, software, firmware, or combination thereof for converting information between the WNSIA and HART protocols. For example, the WNSIA server 122 could include one or more processors 204 and one or more memories 206 capable of storing data and instructions used by the processor(s) 204 (such as a software program implementing the WNSIA-HART multiplexer 202). Also, the WNSIA server 122 could include one or more interfaces 208 facilitating communication with other components of the process control system 100, such as an Ethernet interface and a serial interface.

Any suitable technique could be used by the WNSIA-HART multiplexer 202 to map HART commands into WNSIA commands and to map WNSIA responses into HART responses. For example, in a first approach, a HART generic device descriptor (DD) is used to describe all types of WNSIA field devices, and the HART generic DD is used to convert between the HART and CDA protocols. In a second approach, a WNSIA generic device descriptor for the WNSIA field devices includes similar information as the HART generic device descriptor, along with one or more device-specific commands for all types of WNSIA field devices. In a third approach, a WNSIA device-specific device descriptor may be created for individual types of WNSIA field devices or for individual WNSIA field devices.

In the first approach, the HART generic device descriptor describes all WNSIA field devices. In general, this allows the WNSIA object model to be mapped into a flat HART model. For example, HART messages may be mapped to WNSIA parameters in CDA messages, and vice versa. The following tables identify how specific HART commands may be mapped to specific WNSIA parameters. The contents of these tables are for illustration and explanation only. Other embodiments of the process control system 100 that use other or additional mapping information or associations could be used without departing from the scope of this disclosure.

The HART protocol uses a one-byte manufacturer identifier and a one-byte device type registered with the HART Communication Foundation (HCF). In contrast, WNSIA uses 32-character strings to represent a vendor identifier and a model name. In the first approach, the WNSIA vendor identifier and model name may be set to any constant value(s). Also, WNSIA field devices are identified only using their serial numbers. For example, the last three bytes of a four-byte WNSIA serial number can be used as a HART device identifier.

Table 1 illustrates the mapping for HART command 0 (read unique identifier) into a WNSIA message.

TABLE 1

| Byte | Description | Value |
| --- | --- | --- |
| 0 | Device Type Code for Expansion | 254 |
| 1 | MFR ID | A constant (need not be registered with HCF). |
| 2 | MFR'S DEVICE TYPE | A constant (need not be registered with HCF). |
| 3 | NUMBER RQUEST PREAM | 5 |
| 4 | UNIV CMD REV | 5 |
| 5 | TRANS SPEC REV | Last byte of the 2-byte DevRev parameter in the WNSIA device object. |
| 6 | SOFT REV | Last byte of the Build parameter in the WNSIA device object. |
| 7 | HARD REV | 1 |
| 8 | FLAGS | Any suitable value |
| 9-11 | DEVICE ID NUMBER | Last 3 bytes of the 4-byte WNSIA device serial number parameter in the WNSIA device object. |

Table 2 illustrates the mapping for HART command 1 (read primary variable) into a WNSIA message. Object identifiers (ID) of 3 through 6 respectively represent a primary variable (PV), a secondary variable (SV), a tertiary variable (TV), and a quaternary variable (QV).

TABLE 2

| Byte | Description | Value |
| --- | --- | --- |
| 0 | PV UNITS | For an analog I/O, use the unit field of the Scale parameter of a primary variable transducer (may require conversion from WNSIA units to HART units). For a binary I/O, value set to "Not Used" (i.e. 251). |
| 1-4 | PV | For an analog I/O, use the float of the DS-65 structure as is. For a binary I/O, convert binary 0 or 1 to float 0.0 or 1.0. |

Table 3 illustrates the mapping for HART command 2 (read primary variable current and percent of range) into a WNSIA message. The parameters present in any response message may have values derived from the PV value.

TABLE 3

| Byte | Description | Value |
| --- | --- | --- |
| 0-3 | PV CURR | ((PV value/(Upper Range value − Lower Range value)) * 4)/(20 − 4) |
| 4-7 | PV PER RANGE | (AI PV value/(AI Upper Range value - AI Lower Range value)) * 100.0 |

Table 4 illustrates the mapping for HART command 3 (read dynamic variables and PV current) into a WNSIA message.

TABLE 4

| Byte | Description | Value |
| --- | --- | --- |
| 0-3 | PV CURR | ((PV value/(Upper Range value − Lower Range value)) * 4)/(20 − 4) |
| 4 | PV UNITS | The unit field of the Scale parameter (may require conversion from WNSIA units to HART units). |
| 5-8 | PV | For an analog I/O, use the float of the DS-65 structure as is. For a binary I/O, convert binary 0 or 1 to float 0.0 or 1.0. |
| 9 | SV UNITS | The unit field of the Scale parameter (may require conversion from WNSIA units to HART units). |
| 10-13 | SV | For an analog I/O, use the float of the DS-65 structure as is. For a binary I/O, convert binary 0 or 1 to float 0.0 or 1.0. |
| 14 | TV UNITS | The unit field of the Scale parameter (may require conversion from WNSIA units to HART units). |
| 15-18 | TV | For an analog I/O, use the float of the DS-65 structure as is. For a binary I/O, convert binary 0 or 1 to float 0.0 or 1.0. |
| 19 | QV UNITS | The unit field of the Scale parameter (may require conversion from WNSIA units to HART units). |
| 20-23 | QV | For an analog I/O, use the float of the DS-65 structure as is. For a binary I/O, convert binary 0 or 1 to float 0.0 or 1.0. |

HART commands 4 and 5 may be reserved and not have associated mappings. HART command 6 (write polling address) may not be needed since it may not be used with HART multiplexer networks. HART command 11 (read unique identifier associated with tag) may have the same or similar mapping as HART command 0. Also, for HART command 11, the first eight bytes of the TAG_DESC parameter in the WNSIA device object may be compared.

Table 5 illustrates the mapping for HART command 12 (read message) into a WNSIA message.

TABLE 5

| Byte | Description | Value |
|---|---|---|
| 0-23 | MESSAGE | Any suitable value |

Table 6 illustrates the mapping for HART command 13 (read tag, descriptor, date) into a WNSIA message.

TABLE 6

| Byte | Description | Value |
|---|---|---|
| 0-5 | Tag | Any suitable value |
| 6-17 | Descriptor | Any suitable value |
| 19-20 | Date | Any suitable value |

Table 7 illustrates the mapping for HART command 14 (read primary variable sensor information) into a WNSIA message.

TABLE 7

| Byte | Description | Value |
|---|---|---|
| 0-2 | PV SENSOR SERIAL NUMBER | 0 |
| 3 | PV SENSOR LIMITS/ MIN SPAN UNITS | Not used (i.e. 251). |
| 4-7 | PV UPPER SENSOR LIMIT | 7F A0 00 00 |
| 8-11 | PV LOWER SENSOR LIMIT | 7F A0 00 00 |
| 12-15 | PV MIN SPAN | 7F A0 00 00 |

Table 8 illustrates the mapping for HART command 15 (read primary variable output information) into a WNSIA message.

TABLE 8

| Byte | Description | Value |
|---|---|---|
| 0 | PV ALARM SELECT CODE | Not used (i.e. 251). |
| 1 | PV XFER FNCT | Linear. |
| 2 | PV RANGE VALUES UNITS CODES | The unit field of the Scale parameter (may require conversion from WNSIA units to HART units). |
| 3-6 | PV UPPER RANGE VALUE | The Upper Range value of the Scale parameter (may require conversion from WNSIA units to HART units). |
| 7-10 | PV LOWER RANGE VALUE | The Lower Range value of the Scale parameter (may require conversion from WNSIA units to HART units). |
| 11-14 | PV DAMP VALUE | 7F A0 00 00 |

Table 9 illustrates the mapping for HART command 16 (read assembly message) into a WNSIA message.

TABLE 9

| Byte | Description | Value |
|---|---|---|
| 0-2 | FINAL ASSEMBLY NUMBER | Any suitable value |

Table 10 illustrates the mapping for HART command 17 (write message) into a WNSIA message.

TABLE 10

| Byte | Description | Value |
|---|---|---|
| 0-23 | MESSAGE | Any suitable value |

The mapping for HART command 18 (write tag, descriptor, date) may be similar to the mapping for HART command 13 (read tag, descriptor, date) shown in Table 6. Table 11 illustrates the mapping for HART command 19 (write assembly number) into a WNSIA message.

TABLE 11

| Byte | Description | Value |
|---|---|---|
| 0-2 | FINAL ASSEMBLY NUMBER | Any suitable value |

Table 12 illustrates the mapping for HART command 33 (read transmitter variable) into a WNSIA message. Here, WNSIA object identifiers of 7 and above are mapped to HART Device Variable codes 0 and above.

TABLE 12

| Byte | Description | Value |
|---|---|---|
| 0 | Transmitter Variable in Slot #0 | WNSIA object ID of 7 is mapped to HART Device Variable code 0 |
| 1 | Slot #0 Units Code | Unit code of HART Device Variable code 0 |
| 2-5 | Slot #0 Data | Data of HART Device Variable code 0 |
| 6 | Transmitter Variable in Slot #1 | WNSIA object ID of 7 is mapped to HART Device Variable code 1 |
| 7 | Slot #1 Units Code | Unit code of HART Device Variable code 1 |
| 8-11 | Slot #1 Data | Data of HART Device Variable code 1 |
| 12 | Transmitter Variable in Slot #2 | WNSIA object ID of 7 is mapped to HART Device Variable code 2 |
| 13 | Slot #2 Units Code | Unit code of HART Device Variable code 2 |
| 14-17 | Slot #2 Data | Data of HART Device Variable code 2 |
| 18 | Transmitter Variable in Slot #3 | WNSIA object ID of 7 is mapped to HART Device Variable code 3 |
| 19 | Slot #3 Units Code | Unit code of HART Device Variable code 3 |
| 20-23 | Slot #3 Data | Data of HART Device Variable code 3 |

Table 13 illustrates the mappings for HART command 35 (write primary variable range values) into a WNSIA message.

TABLE 13

| Byte | Description | Value |
|---|---|---|
| 0 | PV range value units | Write this value to the unit part of the Scale parameter in the WNSIA device object. |
| 1-4 | PV upper range value | Write this value to the Upper Range part of the SCALE parameter in the WNSIA device object. |
| 5-8 | PV lower range value | Write this value to the Lower Range part of the SCALE parameter in the WNSIA device object. |

HART command 36 (set primary variable upper range value) and HART command 37 (set primary variable lower range value) can be implemented in the WNSIA-HART multiplexer 202, but this is not required. HART command 38 (reset configuration changed flag) may require no response bytes. Whenever there is a write command, a configuration change bit may be sent with a response upon the success of the write command. Immediately after a write command, HART command 38 could be used by the HART configuration tool 120, so a HART command 38 can be accepted and returned as success without any mapping.

Table 14 illustrates the mappings for HART command 44 (write primary variable units) into a WNSIA message.

TABLE 14

| Byte | Description | Value |
|---|---|---|
| 0 | PV Units Code | Write this value to the unit part of the Scale parameter in the WNSIA device object. |

Table 15 illustrates the mappings for HART command 48 (read additional transmitter status) into a WNSIA message.

TABLE 15

| Byte | Description | Value |
|---|---|---|
| 0-5 | Transmitter-Specific Status | Any suitable value |
| 6 | Operating Mode #1 | Any suitable value |
| 7 | Operating Mode #2 | Any suitable value |
| 8-10 | Analog Output Saturated | Any suitable value |
| 11-13 | Analog Output Fixed | Any suitable value |
| 14-24 | Transmitter-Specific Status | Any suitable value |

Bytes 0-3 in Table 15 represent the 4-byte Device Status (DEV_STATUS) variable in the WNSIA device object. Bytes 4-5 and 14-24 represent transducer block status interpretations. Each status byte may have the following status interpretation:

Bit 0—Configuration error (Bad Quality)
Bit 1—Device failure (Bad Quality)
Bit 2—Sensor failure (Bad Quality)
Bit 3—Out of service (Bad Quality)
Bit 4—Sensor conversion not accurate (Uncertain Quality)
Bit 5—Range limits exceeded (Uncertain quality)
Bit 6—Reserved
Bit 7—Reserved.

The HART configuration tool 120 may show the status interpretation strings as specified in the HART generic device descriptor.

HART command 53 (write transmitter variable units) and HART command 54 (read transmitter variable information) can be supported if desired. However, the use of these commands is not required.

In the second approach, a WNSIA generic device descriptor supports the above-identified mappings, with the addition of several device-specific commands. Also, in this approach, a list associating WNSIA vendor names with HART Manufacturer Identifiers can be used to identify the appropriate WNSIA vendor name or HART Manufacturer Identifier. Further, a list associating different WNSIA model names with HART Device Types can be specified for each vendor.

The WNSIA generic device descriptor may have the same mappings shown above, except for modifications to two of the mappings shown below. Table 16 illustrates the mappings for HART command 0 (read unique identifier) into a WNSIA message.

TABLE 16

| Byte | Description | Value |
|---|---|---|
| 0 | Device Type Code for Expansion | 254 |
| 1 | MFR ID | HART Manufacturer ID used after converting WNSIA 32-character vendor name string into 1-byte HART code. Non-existing vendor name may be given a 1-byte HART code of 250. |
| 2 | MFR'S DEVICE TYPE | HART Device Type used after converting WNSIA 32-character model name string into 1-byte HART code. |
| 3 | NUMBER RQUEST PREAM | 5 |
| 4 | UNIV CMD REV | 5 |
| 5 | TRANS SPEC REV | Last byte of the 2-byte DevRev parameter in the WNSIA device object. |
| 6 | SOFT REV | Last byte of the Build parameter in the WNSIA device object. |
| 7 | HARD REV | 1 |
| 8 | FLAGS | Any suitable value |
| 9-11 | DEVICE ID NUMBER | Last 3 bytes of the 4-byte WNSIA device serial number parameter in the WNSIA device object. |

Table 17 illustrates the mappings for HART command 48 (read additional transmitter status) into a WNSIA message.

TABLE 17

| Byte | Description | Value |
|---|---|---|
| 0-5 | Transmitter-Specific Status | Any suitable value |
| 6 | Operating Mode #1 | Any suitable value |
| 7 | Operating Mode #2 | Any suitable value |
| 8-10 | Analog Output Saturated | Any suitable value |
| 11-13 | Analog Output Fixed | Any suitable value |
| 14-24 | Transmitter-Specific Status | Any suitable value |

Bytes 0-3 in Table 17 represent the 4-byte Device Status variable in the WNSIA device object. Bytes 4-5 and 14-24 represent the transducer block status interpretations. Each status byte may have the same status interpretation described above. However, a user may rearrange these bytes as required for a particular WNSIA device.

Additional device specific commands may include HART command 128 (read static revision and WITK_VER variable in the device object), HART command 129 (read mode parameter of all transducer blocks), and HART command 130 (read read_back value of all output transducer blocks).

In this second approach, a WNSIA generic device descriptor for all WNSIA devices, the WNSIA vendor name—HART Manufacturer Identifier list, and the WNSIA model name—HART Device Type list may be distributed with the installation of the WNSIA-HART multiplexer 202. The lists may be used by the WNSIA-HART multiplexer 202, and the WNSIA generic device descriptor may be copied into the configuration tool's DD library folder. The WNSIA-HART multiplexer 202 may convert WNSIA vendor names and model names into 1-byte HART codes using the lists and return the results in HART command 0. The HART configuration tool 120 may then select the proper DD from the binary files in its library. Using this approach, any status or help strings can be modified, and menus and items in menus can be added, modified, or deleted.

As noted above, generic device descriptors may be copied into the DD library folder of the configuration tool 120. A generic device descriptor could be stored in the library under the Manufacturer ID and Device Type, as they are identified in the lists maintained by WNSIA-HART multiplexer 202. These device descriptors need not be registered with HCF. In particular embodiments, a user may copy the device descriptors into the HART DD library before using the HART configuration tool 120.

In the third approach, a WNSIA device-specific device descriptor is generated for individual WNSIA field devices. In this approach, the above-identified mappings are used, along with device-specific commands for a particular WNSIA field device. The device-specific device descriptor may be capable of representing all WNSIA parameters, and a user may be able to define his or her own string descriptions, variable names, and menus. The look and feel of each WNSIA field device may be different, and the user may be able to modify methods as needed.

As shown in the above tables and associated description, the WNSIA-HART multiplexer 202 functions as a protocol converter that allows HART configuration tools 120 to configure, commission, and monitor WNSIA field devices. A user of the HART configuration tool 120 need not be familiar with the WNSIA protocol (or whatever protocol is used in conjunction with the HART configuration tool 120). Rather, the user may interact with and configure the WNSIA field devices as if they were multiplexed HART field devices.

In particular embodiments, a HART device descriptor can be automatically generated using a WNSIA device descriptor from a vendor. Additional information regarding the conversion of a WNSIA device descriptor into a HART device descriptor can be found in U.S. patent application Ser. No. 11/444,944, which has been incorporated by reference above.

Although FIG. 2 illustrates additional details of one example process control system 100, various changes may be made to FIG. 2. For example, although shown as providing conversions between HART and WNSIA, the WNSIA-HART multiplexer 202 could be replaced or supplemented by any other or additional device or component capable of converting between different protocols. Also, while shown as residing in the WNSIA server 122, the WNSIA-HART multiplexer 202 could be located in any other suitable position, such as in a wireless gateway.

Figure 3:
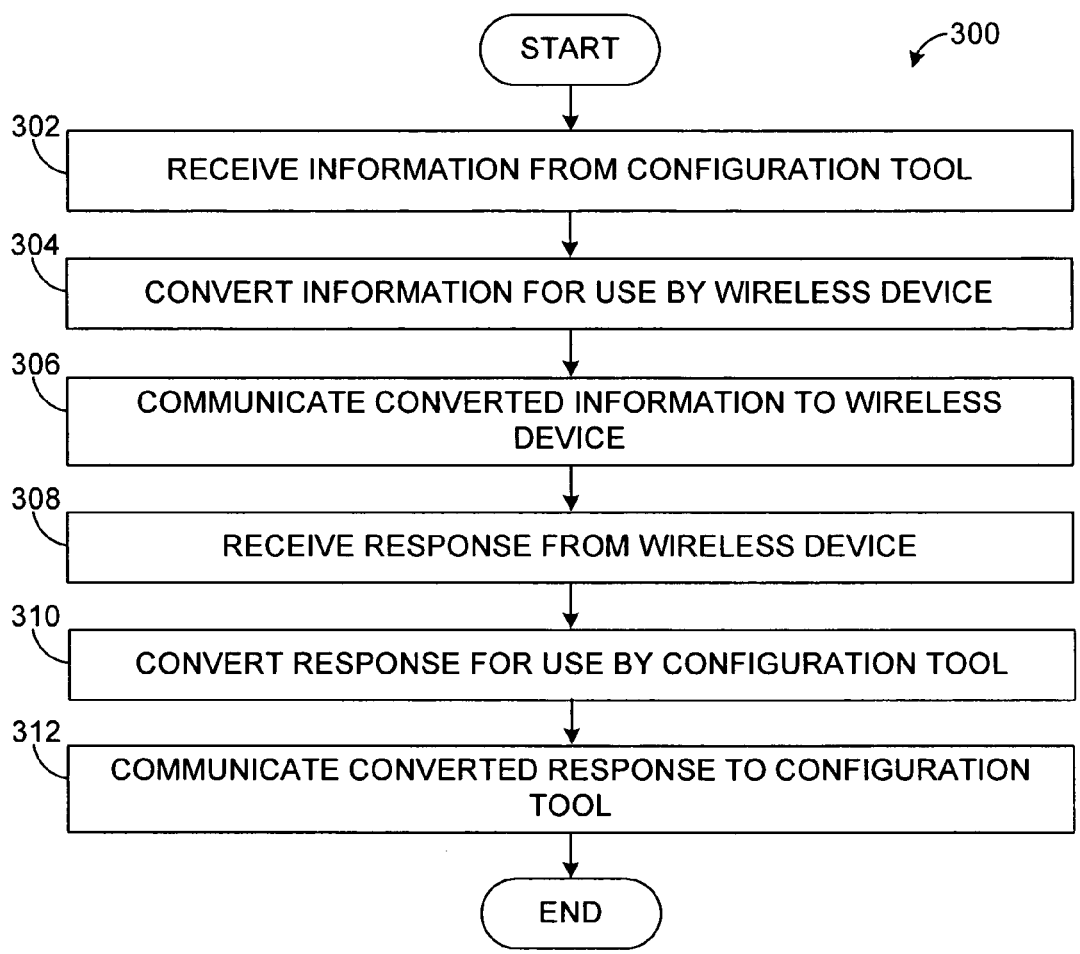
FIG. 3 illustrates an example method for integrating wireless or other field devices in a process control system according to one embodiment of this disclosure.

FIG. 3 illustrates an example method 300 for integrating wireless field devices in a process control system according to one embodiment of this disclosure. For ease of explanation, the method 300 is described as being performed by the WNSIA-HART multiplexer 202 operating on the WNSIA server 122 in the process control system 100 of FIG. 1. The method 300 could be used by any other suitable device and in any other suitable system.

The WNSIA-HART multiplexer 202 receives information from a configuration tool at step 302. This may include, for example, the WNSIA-HART multiplexer 202 receiving a HART command from a HART configuration tool 120. As particular examples, the command could represent a HART command used to configure, commission, or monitor a wireless field device.

The WNSIA-HART multiplexer 202 converts the received information into information suitable for use by a wireless field device at step 304. This may include, for example, the WNSIA-HART multiplexer 202 converting the HART command into a command suitable for use by a WNSIA field device. More specifically, this may include the WNSIA-HART multiplexer 202 mapping parameters in the HART command into parameters compliant with the WNSIA protocol. This may also include the WNSIA-HART multiplexer 202 mapping the HART Manufacturer ID and Device Type into suitable vendor and model names for use in a WNSIA message.

The WNSIA-HART multiplexer 202 communicates the converted information to the wireless field device at step 306. This may include, for example, the WNSIA-HART multiplexer 202 transmitting a WNSIA-compliant message to a wireless field device via one of the wireless gateways 106a-106b. At this point, the wireless field device may use the WNSIA-compliant message in some way, such as by performing a requested function.

The wireless field device may respond by transmitting a response, which is received by the WNSIA-HART multiplexer 202 at step 308. This may include, for example, the WNSIA-HART multiplexer 202 receiving the response from the wireless field device via one of the wireless gateways 106a-106b.

The WNSIA-HART multiplexer 202 converts the response into a response suitable for use by the configuration tool at step 310. This may include, for example, the WNSIA-HART multiplexer 202 converting the WNSIA response into a message suitable for use by the HART configuration tool 120. More specifically, this may include the WNSIA-HART multiplexer 202 mapping parameters in the WNSIA response into parameters compliant with the HART protocol. This may also include the WNSIA-HART multiplexer 202 mapping particular WNSIA vendor and model names into a HART Manufacturer ID and Device Type for use in a HART message.

The WNSIA-HART multiplexer 202 communicates the converted response to the configuration tool at step 312. This may include, for example, the WNSIA-HART multiplexer 202 transmitting a HART-compliant message to the configuration tool 120. At this point, the configuration tool 120 may use the HART-compliant message in some way, such as by informing a user whether the requested function to be performed by the wireless field device was successful.

Although FIG. 3 illustrates one example of a method 300 for integrating wireless field devices in a process control system, various changes may be made to FIG. 3. For example, the WNSIA-HART multiplexer 202 could convert a HART message into a WNSIA message (steps 302-306) and not receive and convert a response (steps 308-312), or vice versa. Also, although described as converting between the HART and WNSIA protocols, the method 300 could involve conversions between any other suitable protocols.

FIGS. 4 through 6 illustrate example details of the WNSIA protocol used in the process control system 100 according to one embodiment of this disclosure. The details shown in FIGS. 4 through 6 represent example details of the WNSIA protocol only. The WNSIA protocol could be modified to operate in different ways without departing from the scope of this disclosure. Also, different wireless protocols could be used in the process control system 100.

As shown in FIG. 4, the WNSIA object model is based on an object-parameter paradigm. Everything within a WNSIA device, including the device itself, is represented by an object. Each object can be categorized as an application object or a management object. In this example, each analog input transducer, analog output transducer, digital or binary input transducer, and digital or binary output transducer is represented by an application object. Each of these application objects contains a set of parameters describing the device or transducer. Also, a physical layer management object (PLMO), Medium Access Control (MAC) layer management object (MLMO), network layer management object (NLMO), and security layer management object (SLMO) are included in the management objects. These management objects are used to manage or control different layers of a communication network stack.

As shown in FIG. 5, if implemented on a single processor, the application objects reside in a user layer. The user layer resides above an Application Interface Layer (AIL), which resides above a complete network stack (including Security, Network, and Physical layers). Management objects representing the various communication stack layers can also be viewed as residing above the AIL.

As shown in FIG. 6, management objects can be implemented on a different processor than the application objects. In this example, the AIL can be viewed as being composed of two parts. One part includes an application user layer and the AIL, which are provided by an application processor. Another part includes a management user layer, the AIL, and the remaining layers of the network stack, which are provided by a network processor. The different AIL portions shown in FIG. 6 are distributed between two or more processors and may communicate with each other over one or more AIL extension channels. These channels may be built on top of any suitable inter-processor communication (IPC) mechanism, such as Ethernet or serial communications.

Each one of the six layers shown in FIGS. 5 and 6 (user, application interface, security, network, L-MAC, L-PHY) may have an interface between itself and an adjacent layer. For example, an application interface may be defined between the user and application interface layers. A security interface may be defined between the application interface and security layers. A network interface may be defined between the security and network layers. A MAC interface may be defined between the network and L-MAC layers. A PHY interface may be defined between the L-MAC and L-PHY layers. In particular embodiments, the application interface is defined and consistent for all WNSIA field devices, while the remaining interfaces are internal and may be implemented differently as long as any applicable RF frames and MAC/PHY requirements are met. The interfaces between the different layers could, for example, be implemented using a set of Application Programming Interface (API) calls, using message passing, or using an IPC mechanism.

Returning to FIG. 4, a hierarchical addressing model may be used to access device data of WNSIA field devices. The top of the hierarchy may be a 16-bit device address. Objects within a device may be identified by an 8-bit object ID (OID). Parameters within an object may be identified by a parameter number (PN). Parameters that are arrays or structures may be supported in the same manner as in Foundation Fieldbus. Individual array or structure elements may be accessed by specifying an 8-bit element index.

Management objects may represent different layers of the wireless communication stack. The physical layer management object (PLMO) may contain attributes of the wireless physical communication layer. A MAC layer management object may contain attributes of the wireless MAC layer. There are also management objects for the network layer and security layer, as well as possibly other management objects. In particular embodiments, management objects within leaf nodes (sensors and actuators) and infrastructure nodes (routing nodes used to route wireless traffic) may be fully specified and fixed, and device vendors may not extend their functionality. Management objects, in addition to parameters, may define one or more function codes that can be invoked by other objects within the same node or from a different node. Function calls could be numbered (such as from 1 to 255).

A sensor application may include a device object, a firmware download object, and one or more transducer blocks. Four types of transducer blocks could be supported, namely analog input transducer blocks (AITB), analog output transducer blocks (AOTB), binary input transducer blocks (BITB), and binary output transducer blocks (BOTB). Each transducer block could correspond to a single process variable or a single output variable. Multivariable sensors may be implemented using multiple AITBs and/or multiple BITBs for each of their measurements. A device block could be associated with an object ID of one. An application firmware download object could be associated with an object ID of two. Transducer blocks may use object ID numbers of three and higher. Management objects may have fixed object ID values starting at 255 and decreasing. Table 18 illustrates a possible association of object IDs with objects.

TABLE 18

| Object ID | Object |
|---|---|
| 1 | Device Object |
| 2 | Application Firmware Download Object |
| 3 | Analog Input Transducer Block 1 |
| 4 | Analog Input Transducer Block 2 |
| ... | ... |
| 244 | Infrastructure Node Physical Layer Management Object |
| 245 | Infrastructure Node MAC Layer Management Object |
| 246 | Leaf Node Physical Layer Management Object |
| 247 | Leaf Node MAC Layer Management Object |
| 248 | Network Layer Management Object |
| 249 | Security Layer Management Object |
| 250 | Device Layer Management Object (DLMO) |
| 251 | Management (Radio Communication) Firmware Download Object |
| 252 | Alert Report Management Object |
| 253 | Reserved |
| 254 | Reserved |
| 255 | Reserved |

The first parameter within a transducer block may be a process variable or output variable (based on the transducer type). Several other parameters following the first parameter may be standard. In addition to the standard parameters, transducer blocks could contain vendor-specific parameters (such as up to 255 total parameters). WNSIA sensor devices may provide measurements in engineering units, and process variable or output variable parameters may use Foundation Fieldbus value-status structures. For example, AITBs and AOTBs may use the Foundation Fieldbus DS-65 data structure, and BITBs and BOTBs may use the Foundation Fieldbus DS-66 data structure for their PV_D and OP_D parameters. The DS-66 data structure may be limited to Boolean values, multi-state discrete values may not be supported, and any non-FALSE value may be treated as TRUE. Floating point numbers may be in the IEEE756 format.

Scalar values and one-dimensional arrays and structures are supported in the WNSIA protocol. Scalar parameters within an object may be uniquely identified by a parameter number, and a parameter index may be ignored if one is specified. Arrays and structures are also supported in the WNSIA protocol, and they may be supported in the same manner as in the Foundation Fieldbus protocols. A one-based index could be used to identify a specific array or structure element. An index of zero may address an entire array or structure as a whole.

To facilitate data access of a WNSIA field device, a parameter class describing a parameter change frequency may be defined as follows. A dynamic (D) parameter class description typically represents a measurement or computed value that changes every time a device executes its algorithm or obtains a new measurement. A static (S) parameter class description typically represents a configuration parameter that only changes when written from an external source or that changes infrequently. A constant (C) parameter class description typically represents a description type parameter identifying a device's physical properties or capabilities that do not change. In particular embodiments, every change to a static parameter may result in incrementing a ST_REV parameter of either a WNSIA device object or the DLMO to indicate that a static parameter has changed. Devices observing the ST_REV parameter can detect a change and refresh a static parameter database accordingly.

WNSIA field device parameters may be further classified by access specification. For example, each parameter could fall into one of three groups, namely read-only (RO), write-only (WO), or read-write (RW). An error may be generated in response to an attempt to write data to a read-only parameter or an attempt to read data from a write-only parameter.

In particular embodiments, the data types used in WNSIA devices may represent a subset of the FF-defined data types. Table 19 summarizes the simple data types defined by FF that could be used in WNSIA devices.

TABLE 19

| Data Type | Index | Number of Octets |
|---|---|---|
| Boolean | 1 | 1 |
| Int8 | 2 | 1 |
| Int16 | 3 | 2 |
| Int32 | 4 | 4 |
| UInt8 | 5 | 1 |
| UInt16 | 6 | 2 |
| UInt32 | 7 | 4 |
| Float32 | 8 | 4 |
| String | 9 | 1-32 |
| Blob | 10 | 1-32 |
| Date | 11 | 7 |
| TimeDif | 13 | 4 or 6 |
| Bitstring | 14 | 1-4 |
| Time | 21 | 8 |

Table 20 identifies a subset of the FF-defined standard data structures that could be used in WNSIA devices.

TABLE 20

| Data Type | Index | Number of Octets |
|---|---|---|
| Value & Status - Float | 65 | 5 |
| Value & Status - Boolean | 66 | 2 |
| Scaling | 68 | 11 |

A new non-FF data type may be designed to describe connection endpoints. The data type could be specified as "Connection Endpoint" with an index value of "320" and a size of 8 octets. Data structure types may be referred to using the "DS-xx" nomenclature, where DS stands for Data Structure and xx is the type number (the index value).

As described above, a status byte may be used to describe the status of a process variable. In particular embodiments, a process variable status byte includes three bit-fields as shown in Table 21. These fields may represent a consistent subset of the Foundation Fieldbus, HART, and OLE Process Control (OPC) status byte practices.

TABLE 21

| Bit 7  Bit 6 Quality | Bit 5 Reserved | Bit 4  Bit 3  Bit 2 Sub-Status | Bit 1  Bit 0 Limit Status |
|---|---|---|---|
| 0 - Bad | 0 | 0 - Non-specific<br>1 - Configuration error<br>3 - Device failure<br>4 - Sensor failure<br>7 - Out of service<br>x - Other values reserved | 0 - Not limited<br>1 - Low limited<br>2 - High limited<br>3 - Constant (high and low limited) |
| 1 - Uncertain | | 0 - Non-specific<br>4 - Sensor conversion not accurate<br>5 - Range limits exceeded<br>x - Other values reserved | |
| 2 - Good | | 0 - No special condition exists<br>x - Other values reserved | |
| 3 - Reserved | | Reserved | |

A Mode parameter in each transducer block may represent an 8-bit integer with an enumerated set of values. The Mode parameter may be defined as a subset of the FF mode definition. There could be no distinction between target and actual modes. There may also be no concept of normal or permitted modes. In some embodiments, two modes are defined, namely an Out of Service (OOS) mode and an Automatic (AUTO) mode. In particular embodiments, an 8-bit value is associated with the Mode parameter, where bit 7 (the most significant bit) corresponds to the OOS mode, bit 3 corresponds to the AUTO mode, and all other bits are reserved (and may be set to 0). This 8-bit value could be represented by an unsigned integer (UInt8), where the OOS mode corresponds to a decimal value of 127 and the AUTO mode corresponds to a decimal value of 8. All bits in the Mode parameter value could be mutually exclusive (i.e. the Mode parameter is not a bit string). Other modes, such as manual, local override, or cascade, may be added using the reserved bits.

The Mode parameter in the transducer blocks may be related to alarm processing. Setting the Mode parameter to OOS (inactivating a block) may cause all active alarms to return to normal, and corresponding reports are published on the network. Activating a device or setting its Mode parameter to a value other than OOS causes the device to process its alarm conditions and generate alarm reports for those that are active. The Mode parameter may also be related to data publications. If a connection is configured and a transducer is publishing its process variable, setting the Mode parameter to OOS may not stop the publication. Rather, the data quality may be changed to "Bad" with a sub-status of "Out of Service."

As noted above, a WNSIA device object may be used to represent a WNSIA field device. Table 22 illustrates the various parameters of a standard WNSIA device object.

TABLE 22

| # | Name | Data Type | CLS | ACC | Description |
|---|---|---|---|---|---|
| 1 | ST_REV | UInt16 | D | RO | Static data revision for entire device application process. Change of static data member in application object increments this. |
| 2 | TAG_DESC | String | S | RW | 32-character string containing device tag descriptor. |
| 3 | VENDOR | String | C | RO | 32-character string identifying device vendor. |
| 4 | MODEL | String | C | RO | 32-character string identifying device model. |
| 5 | SERIALNUM | UInt32 | C | RO | 32-bit device serial number. |
| 6 | DEVREV | UInt16 | C | RO | 16-bit revision number. |
| 7 | BUILD | UInt16 | C | RO | 16-bit software build number. |
| 8 | DEV_STATUS | Bit-string | D | RO | 32-bit bitstring indicating device error and status conditions. |
| 9 | NUMTB | UInt8 | C | RO | Number of transducer blocks in device. |
| 10 | TBTYPE | UInt8 | C | RO | Array of transducer types. Array size is the NUMTB parameter. Each array element can be one of: AITB = 0, AOTB = 1, BITB = 2, and BOTB = 3. |
| 11 | WITK_VER | UInt16 | C | RO | Wireless interoperability test kit revision that the device complies with. |
| 12 | ALLOW_EHM_ACC | Boolean | S | RW | Enable Equipment Health Monitoring (EHM) tools to access device data - read, write, and method execution. EHM tools cannot change this parameter. It can only be set by plant operators. |
| 13 | Reserved | | | | Reserved |
| 14 | Reserved | | | | Reserved |
| 15 | Reserved | | | | Reserved |
| 16 | Reserved | | | | Reserved |
| 17 | Reserved | | | | Reserved |
| 18 | Reserved | | | | Reserved |
| 19 | Reserved | | | | Reserved |

Here, "CLS" represents the parameter class description (dynamic, static, constant), and "ACC" represents the access specification (read-only, write-only, read-write).

The Vendor, Model, DevRev, and SerialNum parameters may serve several purposes related to device identification. For example, the Vendor-Model-SerialNum triplet may uniquely identify a given physical device, which can be used during the device commissioning process to map a device configured offline to an actual piece of hardware. As another example, the Vendor-Model-DevRev triplet combined with a DDRev parameter (identifying a DD file revision) may uniquely identify a device descriptor required to create a system template for a given device. The DD revision (DDRev) may allow for the ability to update DD files that correspond to the same version of device firmware. As yet another example, the Vendor-Model-DevRev-Build combination may uniquely identify a device's firmware. These relationships are summarized in Table 23.

TABLE 23

|          | Device Hardware | Device Firmware | DD |
|----------|-----------------|-----------------|----|
| Vendor    | X | X | X |
| Model     | X | X | X |
| SerialNum | X |   |   |
| DevRev    |   | X | X |
| DDRev     |   |   | X |
| Build     |   | X |   |

The Build parameter may be used to reflect a device firmware version. While a change in DevRev may necessitate a new DD revision, the Build number can be incremented independently of the DD changes. Also, the Build, DevRev, and DDRev parameters may provide two degrees of freedom, namely an ability to change DD files without releasing new device firmware and an ability to change device firmware without releasing new DD files. The Build numbering may be relative to the DevRev value. In other words, firmware with a different DevRev revision may use the same Build to identify its firmware build variant within a device revision family. In particular embodiments, any set of DD files with the same DevRev value can be used to represent a device in a host system, where the highest DDRev value for a given DevRev value is the most recent DD revision.

A device application may contain at least one firmware download object, which is used to upgrade the device application over a wireless connection. Multi-processor devices can contain multiple firmware download objects, such as when a dual-processor device with a sensor/actuator application on one processor and a radio communication stack on another processor contains two firmware download objects (one for upgrading the sensor/actuator software, another for upgrading the radio communication stack). Table 24 illustrates the parameters of a firmware download object (which might not be extensible by vendors).

Table 25 identifies the parameters in an analog input transducer block.

TABLE 25

| # | Name | Data Type | CLS | ACC | Description |
|---|------|-----------|-----|-----|-------------|
| 1 | PV | DS-65 | D | RO | Measurement variable in engineering units of the sensor. |
| 2 | MODE | UInt8 | D | RW | Transducer mode |
| 3 | OUTCONN | DS-320 | S | RW | Output connection specification for process variable. |
| 4 | SCALE | DS-68 | S | RW | Range and units of the measurement variable. |
| 5 | Reserved |  |  |  | Reserved |

Table 26 identifies the parameters in a binary input transducer block.

TABLE 26

| # | Name | Data Type | CLS | ACC | Description |
|---|------|-----------|-----|-----|-------------|
| 1 | PV_B | DS-66 | D | RO | Discrete measurement variable. |
| 2 | MODE | UInt8 | D | RW | Transducer mode |
| 3 | OUTCONN | DS-320 | S | RW | Output connection specification for process variable. |
| 4 | Reserved |  |  |  | Reserved |
| 5 | Reserved |  |  |  | Reserved |

Table 27 identifies the parameters in an analog output transducer block.

TABLE 24

| # | Name | Data Type | CLS | ACC | Description |
|---|------|-----------|-----|-----|-------------|
| 1 | FW_DLD_CMD | UInt16 | S | RW | Firmware download command. Valid values are DLD_START = 1, DLD_ABORT = 2, and DLD_ACTIVATE = 3. |
| 2 | FW_DLD_STAT | UInt16 | D | RO | Firmware download status. Valid values are DLD_INACTIVE = 1, DLD_ACTIVE = 2, DLD_OK = 3, and DLD_ERROR = 4. |
| 3 | FW_DLD_ERR | UInt16 | D | RO | Vendor-defined firmware download error code. Zero indicates no error. |
| 4 | FW_DLD_PREP_TO | UInt16 | C | RO | Time in seconds for device to prepare for download. |
| 5 | FW_DLD_ACT_TO | UInt16 | C | RO | Time in seconds for device to activate new firmware. |
| 6 | FW_DLD | Blob | S | WO | Parameter for storing device application firmware packets. |

TABLE 27

| # | Name | Data Type | CLS | ACC | Description |
|---|------|-----------|-----|-----|-------------|
| 1 | OP | DS-65 | D | RW | Output value for the actuator. |
| 2 | MODE | UInt8 | D | RW | Transducer mode |
| 3 | INCONN | DS-320 | S | RW | Input connection specification for output variable. |
| 4 | READBACK | DS-65 | D | RO | Readback value of the actual position of the actuator. |
| 5 | OUTCONN | DS-320 | S | RW | Output connection specification for READBACK. |
| 6 | SCALE | DS-68 | S | RW | Range and units of the output variable. |
| 7 | Reserved | | | | Reserved |
| 8 | Reserved | | | | Reserved |
| 9 | Reserved | | | | Reserved |

Table 28 identifies the parameters in a binary output transducer block.

TABLE 28

| # | Name | Data Type | CLS | ACC | Description |
|---|------|-----------|-----|-----|-------------|
| 1 | OP_B | DS-66 | D | RW | Output value for the actuator. |
| 2 | MODE | UInt8 | D | RW | Transducer mode |
| 3 | INCONN | DS-320 | S | RW | Input connection specification for output variable. |
| 4 | READBACK_B | DS-66 | D | RO | Readback value of the actual position of the actuator. |
| 5 | OUTCONN | DS-320 | S | RW | Output connection specification for READBACK. |
| 6 | Reserved | | | | Reserved |
| 7 | Reserved | | | | Reserved |
| 8 | Reserved | | | | Reserved |
| 9 | Reserved | | | | Reserved |

In some embodiments, WNSIA device vendors are required to provide device descriptors for their WNSIA devices. The device descriptors define the number of transducer blocks, their types, and all parameters of each transducer block. The Foundation Fieldbus Device Description Language (DDL) specifications may be used to define the device descriptors for the WNSIA devices. As a result, users may develop WNSIA device descriptors using the FF tokenizer toolkit and the FF standard DD library toolkit from the Fieldbus Foundation. Users may develop devices (such as the gateways 106a-106b) that communicate with WNSIA field devices using the FF DD services toolkit from the Fieldbus Foundation.

In particular embodiments, the WNSIA device descriptors may include a subset of the DDL constructs defined in the FF DDL specification (such as Specification FF-900, which is hereby incorporated by reference). For example, the DDL constructs that may be used in WNSIA device descriptors could include the BLOCK, VARIABLE, MENU, EDIT-DISPLAY, METHOD, RELATION, UNIT, REFRESH, WRITE-AS-ONE, ITEM-ARRAY, COLLECTION, RECORD, ARRAY, RESPONSE CODE, LIKE keyword, and EXPRESSION constructs. As another example, the DDL constructs that may not be used in WNSIA device descriptors could include the PROGRAM, DOMAIN, VARIABLE LIST, OPEN/CLOSE keywords, and possibly CONDITIONAL constructs.

To facilitate the generation of WNSIA device descriptors by vendors, manufacturers, or other entities associated with wireless field devices, standard wireless DD files could be made available or provided to the entities. These standard DD files could be provided for each transducer block type (analog input, analog output, digital input, digital output), and the standard files may be imported into WNSIA device DDL source files. The vendors, manufacturers, or other entities could add their own device-specific parameters to the standard DD files, such as by using the ADD, DELETE, and REDEFINE DDL constructs to add, delete, or modify the attributes of a block. The vendors, manufacturers, or other entities could be prevented from deleting any of the standard or required attributes of the imported standard DD files (although they could be redefined using the REDEFINE construct). The Foundation Fieldbus Specification FF-901 (which is hereby incorporated by reference) provides additional information about these constructs and their attributes.

DD developers could rely on a set of specifications, tools, and standard files to produce WNSIA device descriptors. The standard specifications may include the FF DDL source language specification, which specifies a structured text language used to define the meaning and relationships between available wireless field device data. It also specifies the syntax of the language used in WNSIA DDL source files. Another standard specification is the FF DDL binary encoding specification, which specifies a standard encoding of DDL source files into a binary file format. Device specifications could also be used, where the device specifications are used to customize standard wireless DDL files and produce vendor-, manufacturer-, or other entity-specific device descriptors for given device types. Once created, DDL source files may be tokenized into binary format and delivered to a host system, which uses FF DD services libraries to interpret information contained in the binary WNSIA DDL files.

Although FIGS. 4 through 6 illustrate example details of the WNSIA protocol used in the process control system 100, various changes may be made to FIGS. 4 through 6. For example, other or additional divisions between objects could be used in place of or in addition to the divisions shown in FIG. 4. Also, other or additional protocol stacks could be used in place of or in addition to the stacks shown in FIGS. 5 and 6. In addition, other or additional parameters could be contained in the tables described above.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    receiving first information from a configuration tool in a process control system, the configuration tool associated with a first field device protocol, the configuration tool operable to receive input from a user and to configure, commission, or monitor a field device in the process control system;
    converting the first information associated with the first field device protocol into second information associated with a second field device protocol using a protocol converter; and
    communicating the second information to the field device in the process control system using the second field device protocol;
    wherein the second field device protocol comprises a Wireless Network for Secure Industrial Application (WNSIA) protocol;
    wherein, under the WNSIA protocol, an object is associated with the field device and one or more objects are associated with one or more transducers of the field device, each transducer associated with a process or output variable, each object comprising one or more parameters describing the associated device or transducer; and
    wherein communicating the second information to the field device comprises using a device address associated with the field device, an object identifier identifying one of the objects associated with the identified field device, and a parameter identifier identifying one of the parameters associated with the identified object.

2. The method of claim 1, wherein:
    communicating the second information comprises communicating the second information to a wireless gateway operable to communicate wirelessly with the field device.

3. The method of claim 1, further comprising:
    receiving third information associated with the second field device protocol, the third information originating at the field device;
    converting the third information into fourth information associated with the first field device protocol; and
    communicating the fourth information to the configuration tool.

4. The method of claim 3, wherein:
    each of the first information and the second information comprises a command; and
    each of the third information and the fourth information comprises a response to the command.

5. The method of claim 1, wherein:
    the first field device protocol comprises a Highway Addressable Remote Transducer (HART) protocol; and
    the protocol converter comprises a HART multiplexer.

6. The method of claim 5, wherein converting the first information into the second information comprises using at least one of:
    a first list associating HART manufacturer identifiers and vendor names; and
    a second list associating HART device types and vendor model names.

7. The method of claim 1, wherein converting the first information into the second information comprises using at least one of:
    a generic device descriptor associated with multiple types of field devices;
    a generic device descriptor having one or more device-specific commands associated with multiple types of field devices; and
    a device descriptor having one or more device-specific commands associated with a particular type of field device or with a particular field device.

8. The method of claim 1, wherein:
    the protocol converter comprises a multiplexer supporting the first field device protocol for communications with the configuration tool;
    the configuration tool interacts with the field device as if the field device was coupled to the multiplexer using the first field device protocol; and
    commands defined by the first field device protocol and contained in the first information that are not used in a multiplexer network are dropped by the protocol converter and not communicated as the second information to the field device.

9. The method of claim 1, wherein the field device comprises at least one of: a sensor and an actuator.

10. An apparatus, comprising:
    at least one memory operable to store mapping information defining mappings between a first field device protocol and a second field device protocol; and
    at least one processor operable to:
        receive a first command associated with the first field device protocol from a configuration tool, the configuration tool operable to receive input from a user and to configure, commission, or monitor a field device in a process control system;
        convert the first command into a second command associated with the second field device protocol using at least some of the mapping information; and
        communicate the second command to the field device in the process control system;
    wherein the second field device protocol comprises a Wireless Network for Secure Industrial Application (WNSIA) protocol;
    wherein, under the WNSIA protocol, an object is associated with the field device and one or more objects are associated with one or more transducers of the field device, each transducer associated with a process or output variable, each object comprising one or more parameters describing the associated device or transducer; and wherein the at least one processor is operable to communicate the second command to the field device using a device address associated with the field device, an object identifier identifying one of the objects associated with the identified field device, and a parameter identifier identifying one of the parameters associated with the identified object.

11. The apparatus of claim 10, wherein:
the at least one processor is operable to communicate the second command to a wireless gateway over a network, the wireless gateway operable to communicate wirelessly with the field device.

12. The apparatus of claim 10, wherein the at least one processor is further operable to drop commands defined by the first field device protocol and contained in the first information that are not used in a multiplexer network.

13. The apparatus of claim 10, further comprising:
a serial interface operable to receive the first command from the configuration tool; and
an Ethernet interface operable to transmit the second command over a network.

14. The apparatus of claim 10, wherein the at least one processor is further operable to:
receive a first response to the second command, the first response associated with the second field device protocol;
convert the first response into a second response associated with the first field device protocol using at least some of the mapping information; and
communicate the second response to the configuration tool.

15. The apparatus of claim 10, wherein:
the first field device protocol comprises a Highway Addressable Remote Transducer (HART) protocol; and
the apparatus is configured to appear as a HART multiplexer to the configuration tool.

16. The apparatus of claim 15, wherein the at least one processor is operable to convert the first command into the second command using at least one of:
a first list associating HART manufacturer identifiers and vendor names; and
a second list associating HART device types and vendor model names.

17. The apparatus of claim 10, wherein the at least one processor is operable to convert the first command into the second command using at least one of:
a generic device descriptor associated with multiple types of field devices;
a generic device descriptor having one or more device-specific commands associated with multiple types of field devices; and
a device descriptor having one or more device-specific commands associated with a particular type of field device or with a particular field device.

18. A tangible computer readable medium embodying a computer program, the computer program comprising computer readable program code for:
receiving first information from a source in a process control system, the first information associated with a first field device protocol, the source comprising a configuration tool operable to receive input from a user and to configure, commission, or monitor a target in the process control system;
converting the first information associated with the first field device protocol into second information associated with a wireless second field device protocol; and
communicating the second information to the target in the process control system;
wherein the second field device protocol comprises a Wireless Network for Secure Industrial Application (WNSIA) protocol:
wherein, under the WNSIA protocol, an object is associated with the target and one or more objects are associated with one or more transducers of the target, each transducer associated with a process or output variable, each object comprising one or more parameters describing the associated target or transducer; and
wherein the computer readable program code for communicating the second information to the target uses a device address associated with the target, an object identifier identifying one of the objects associated with the identified field device, and a parameter identifier identifying one of the parameters associated with the identified object.

19. The computer readable medium of claim 18, further comprising computer readable program code for:
receiving third information associated with the second field device protocol, the third information originating at the target;
converting the third information into fourth information associated with the first field device protocol; and
communicating the fourth information to the source.

20. The computer readable medium of claim 19, wherein:
the first field device protocol comprises a Highway Addressable Remote Transducer (HART) protocol;
the target comprises a wireless field device;
each of the first information and the second information comprises a command; and
each of the third information and the fourth information comprises a response to the command.

21. The computer readable medium of claim 20, wherein the computer readable program code for converting the first information into the second information comprises computer readable program code for using at least one of:
a first list associating HART manufacturer identifiers and vendor names; and
a second list associating HART device types and vendor model names.

* * * * *